May 27, 1969
A. G. BODINE, JR
3,446,084
SONIC VIBRATION GENERATOR
Original Filed Aug. 4, 1965
Sheet 1 of 6
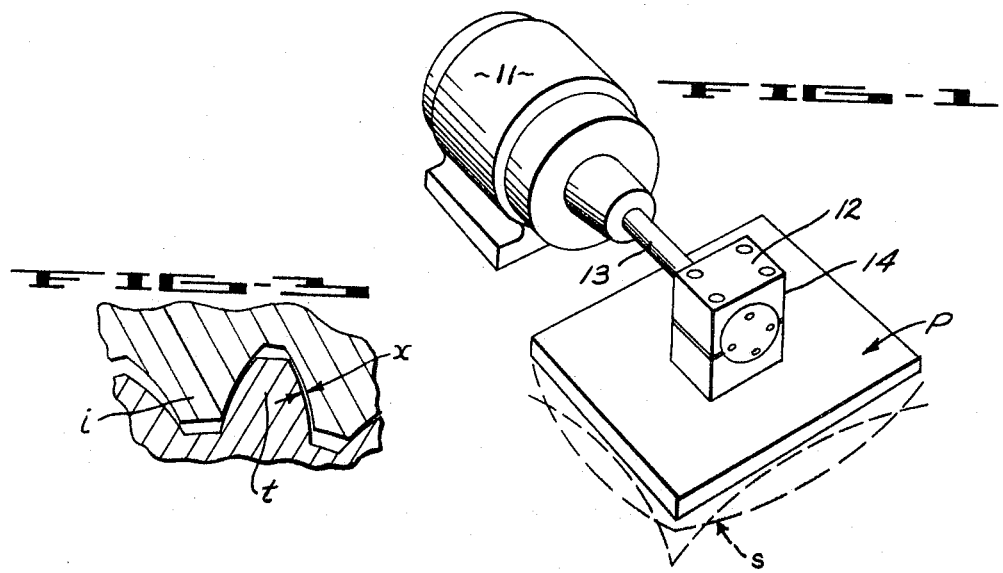
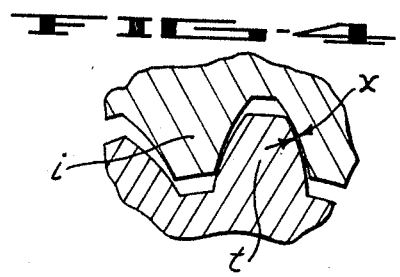
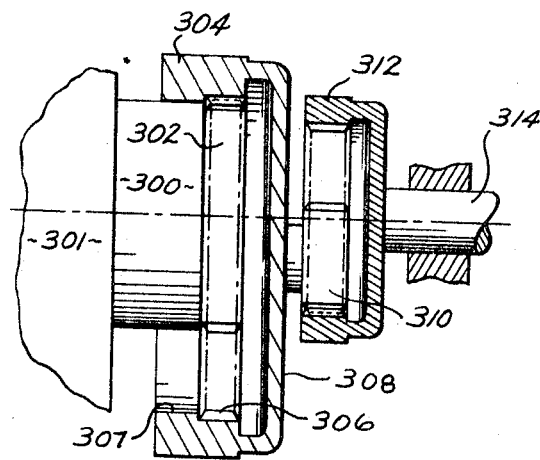
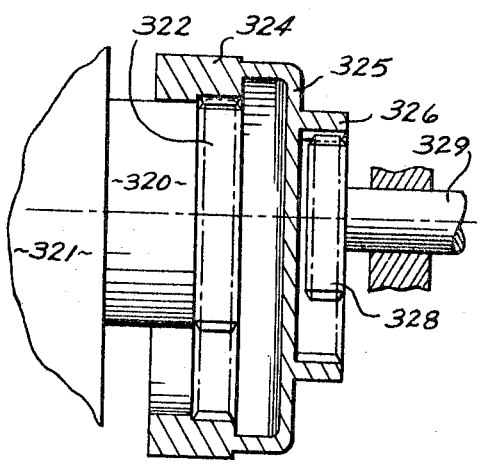
INVENTOR.
ALBERT G. BODINE, JR.
BY
ATTORNEY

INVENTOR.
ALBERT G. BODINE, JR.
BY
ATTORNEY

INVENTOR.
ALBERT G. BODINE, JR.
BY
ATTORNEY

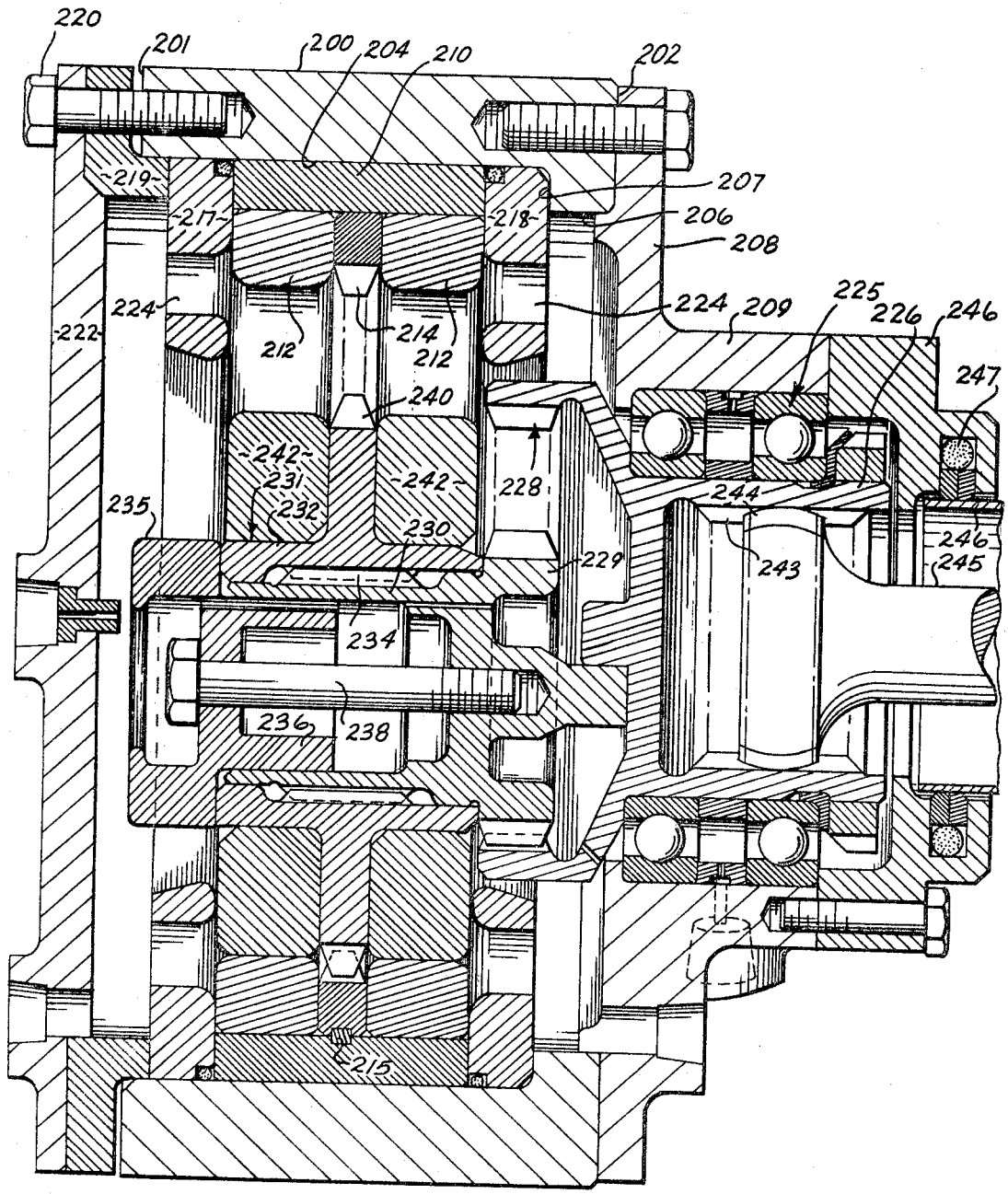

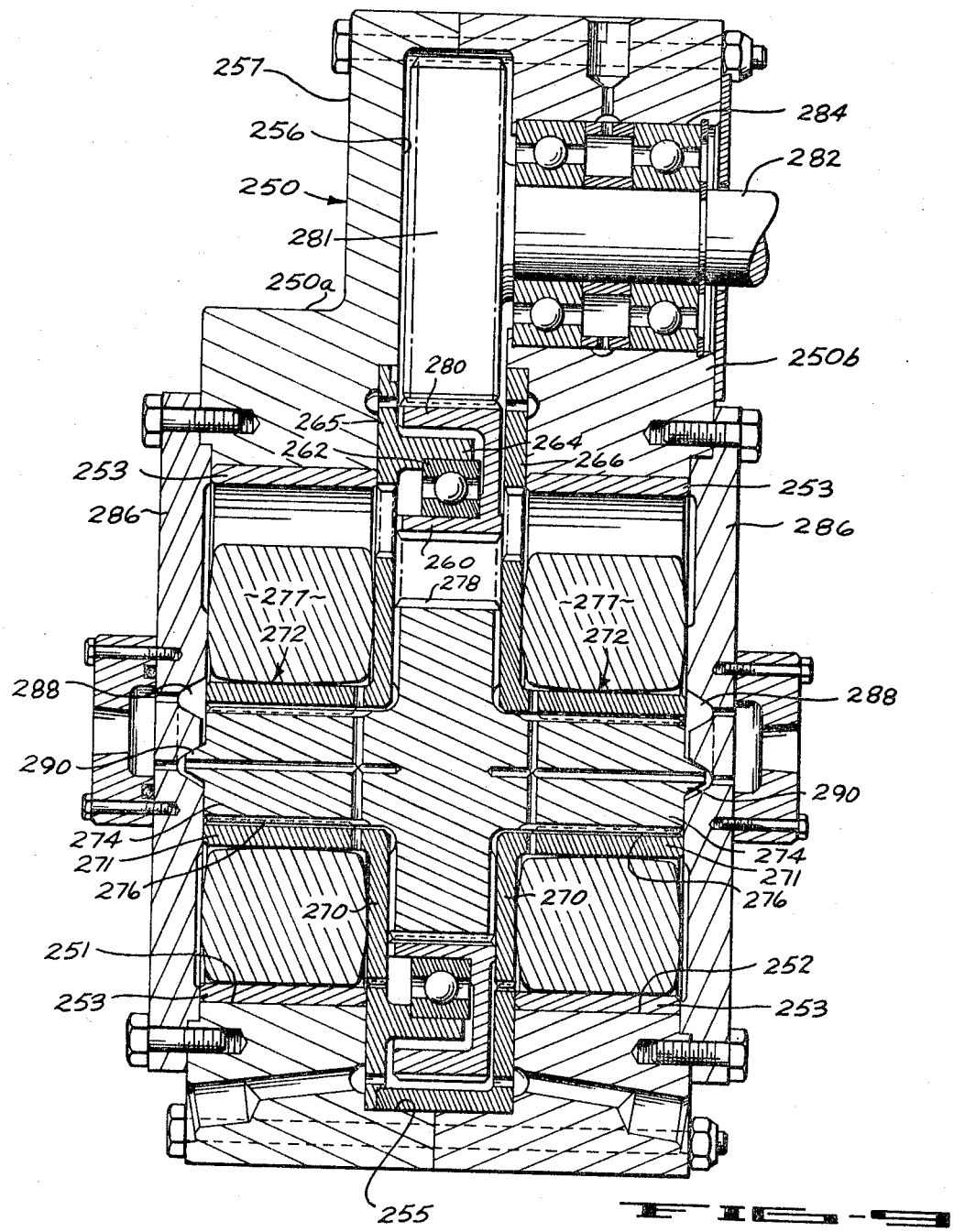

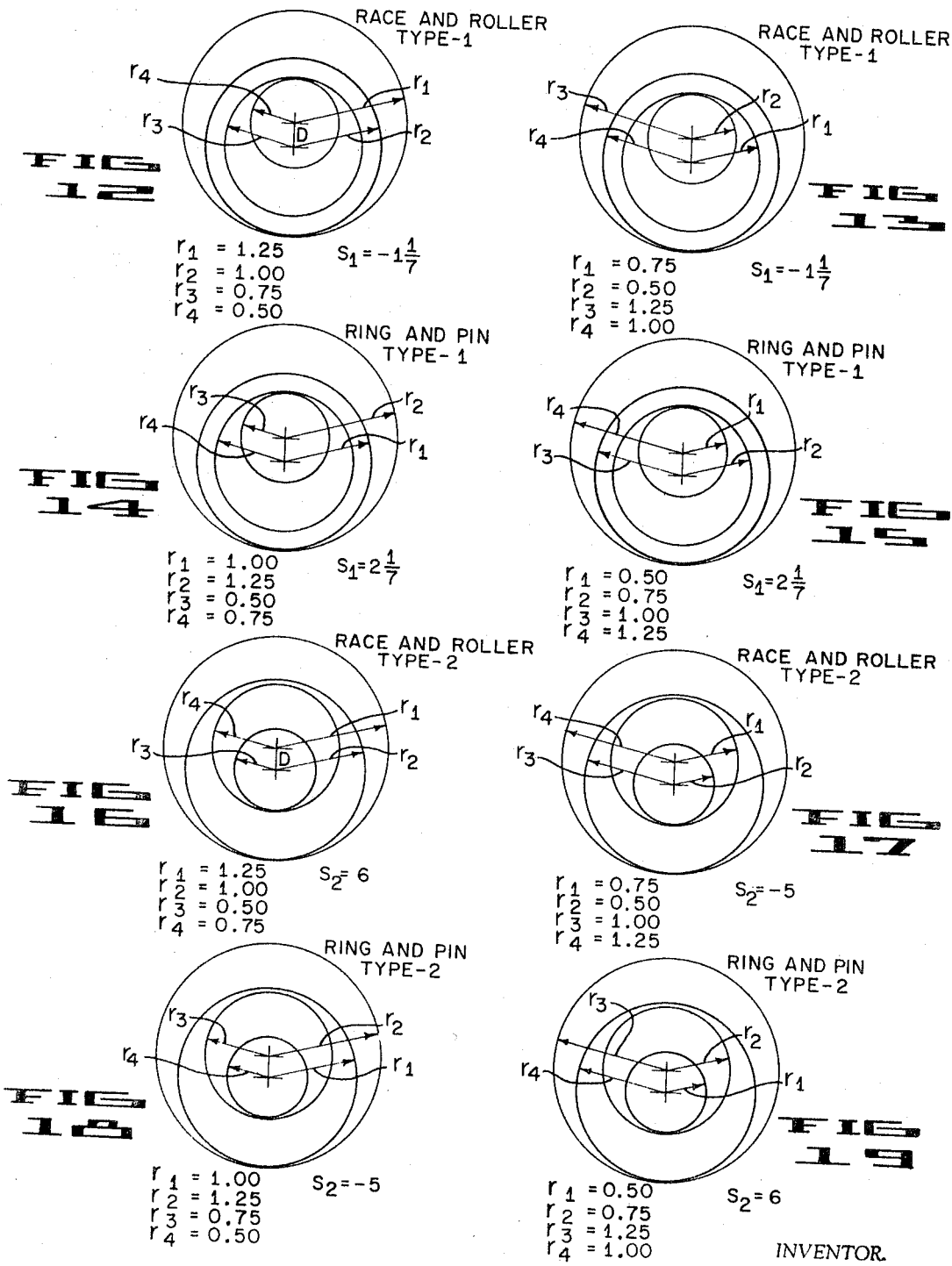

United States Patent Office 3,446,084
Patented May 27, 1969

3,446,084
SONIC VIBRATION GENERATOR
Albert G. Bodine, Jr., Los Angeles, Calif.
(7877 Woodley Ave., Van Nuys, Calif. 91406)
Continuation of application Ser. No. 477,250, Aug. 4, 1965, which is a continuation-in-part of applications Ser. No. 181,385, Mar. 21, 1962 and Ser. No. 402,474, Oct. 8, 1964. This application July 11, 1966, Ser. No. 573,731

Int. Cl. F16h 37/00
U.S. Cl. 74—87          2 Claims

ABSTRACT OF THE DISCLOSURE

An orbiting-mass oscillator has a rotor which is orbitally driven around a raceway by means of a geared drive mechanism. The oscillator is coupled to a resonant vibration system and operated at a frequency such as to cause resonant elastic vibration of such system. The drive mechanism is designed so that there is sufficient play between the gear teeth thereof under dynamic operating conditions to effectively "unload" such teeth thereby damping the undesirable effects on the oscillator system of high-level torquing feedback signals from the vibration system.

---

This application is a continuation of my prior and copending application of the same title, filed Aug. 4, 1965, Ser. No. 477,250, now abandoned, which was a continuation-in-part of my earlier copending application entitled Vibration Generator for Resonant Loads and Sonic Systems Embodying Same, Ser. No. 181,385, filed Mar. 21, 1962, now Patent No. 3,217,551, and also of my prior copending application entitled Mechanical Sonic Vibration Generator With Frequency Step-up Characteristic, Ser. No. 402,474, filed Oct. 8, 1964, now Patent No. 3,299,722.

This invention relates generally to vibration generators combined with and adapted especially for setting up vibrations in elastically virbratory resonator devices and workloads coupled thereto, such as are particularly useful in various forms of industrial sonically vibratory power machinery.

A large number of vibration generators for such purposes have been proposed in the past, such as unbalanced flywheels, gyratory balls and other forms of rollers, some of these being shaft driven, others driven by streams of air under pressure, and the like. Each of these, and many others unmentioned herein, has its place and use, depending upon impulse required and the frequency at which the generator is to operate. However, many of these have problems and limitations, such as undue bearing loads, some of which are aggravated when driving loads in a resonant frequency range of the load, or of a resonating elastically vibratory transmission means or resonator between the generator and load.

The present application is directed to certain aspects and subject matter of the generator of my aforementioned application Serial No. 181,385 when utilized in a combination with an elastically vibratory resonator, and to further improvements in and further species of the generator there disclosed.

A general object of the invention is to provide a novel combination of vibration generator and elastically vibratory resonator, using an improved generator of the class mentioned, capable of application in sonic power applications where power levels may be of the order of hundreds of horsepower and frequencies may run from, say, twenty or thirty cycles per second up to the orders of hundreds or even thousands of cycles per second, as uniquely demanded by sonic well drills, sonic pile drivers, sonic tunnel drivers, deep well sonic pumps, heavy sonic earth-working machinery, sonic material processing, and the like.

The generator used in the present invention is of a class which may be embodied in either of two physical forms: first, a gyratory inertia roller which rolls around the inside of a cylindrical bearing raceway in an orbital path; and, second, a gyratory inertia ring which surrounds and spins orbitally on a cylindrical bearing pin. In both cases, the gyratory inertia member develops a centrifugal force which furnishes a periodic, rotating force vector output. This output can be taken off as a periodic alternating sinusoidal force in any direction in the plane of the rotating force vector. The first generator form referred to above will be given primary attention herein but without implication of limitation thereto.

Assume, then, a cylindrical raceway in a body or housing, and a cylindrical inertia roller of somewhat smaller diameter, but of substantial mass, adapted to run around inside the raceway, and to exert a centrifugal force thereon. The roller is typically freely rotatable on a pin or axle, and the latter projects axially from a spur gear. The spur gear meshes with a fixed internal raceway gear formed coaxially with and just to the side of the cylindrical raceway. The roller rolls around the raceway, and the spur gear rolls around the internal gear, both the roller and the spur gear moving together in an orbital path as a unitary orbital rotor. Ordinarily, however, there will be some (usually small) relative rotation between the roller running on the track and the spur gear meshing with the internal gear.

The spur gear must be driven in its orbital path, and this may be accomplished in several ways. For example, in a form herein referred to as Type 1, the spur gear may have fixed thereto a concentric internal gear, and the latter may be driven by an input spur pinion that is coaxial with the cylindrical raceway. As another example, herein referred to as Type 2, the spur gear may have fixed to one side thereof, coaxially therewith, another spur gear, which may be driven by an internal input gear coaxial with the raceway. Of these, Type 1 is a lowspur gear, which may be driven by an internal input gearto vibration output varies, within typical limitations of gear size and design, from about one to five step-down to five to one step-up. Type 2 tends to be inherently a high-ratio design, in which the frequency ratio varies from about two to one step-up to a theoretical infinite step-up, this also being limited by practical gear design. Other methods of drive of the spur gear that meshes with the internal raceway gear may be used. See my aforesaid prior application Ser. No. 181,385.

It will be seen that a basic feature of this vibration generator or oscillator is that use of a spur gear rolling around the inside of an internal raceway gear. Motion is obtained by applying torque, or a circumferential driving force, to the spur gear part of the system, so as to cause the spur gear to roll around inside the internal gear. The mass which is associated with the spur gear, including the mass of the roller which is concentric with the spur gear, then describes an orbital path, thus producing a centrifugal force which is the source of the periodic output force of the generator.

The periodic output force of the generator or oscillator appears as a cyclic reactive or inertial force which is exerted by the housing of the generator on whatever this housing may be coupled to; and in the practice of the invention, the generator is coupled to an elastically vibratory resonator, having a resonant frequency range. The orbiting mass rotor or roller of the oscillator is driven by its prime mover in this resonant frequency range, which permits efficient delivery of large vibratory energy from the intercoupled oscillator and resonator.

To the latter is then coupled the "work" or "load." Such "load" may of course vary in impedance during the performance of a job, and this variation may be in either the resistive or a reactive component of the impedance.

In the event of a change in load impedance during operation, an orbiting-mass type oscillator-resonator combination driving the load tends automatically to change frequency and/or phase angle, so as to maintain its energy delivery to the load. The resonant frequency of the system as a whole may tend to shift, or the orbiting-mass rotor to advance or retard its relative angular position in its raceway (phase angle), or both. Also, operation being in the region of resonance, there can be accompanying shifts in vibration amplitude. These changes, which often come suddenly and sharply, involve small but significant circumferential adjustments of the teeth of the intermeshing spur and internal oscillator gears. It is important to smooth and effective performance of the orbiting-mass type oscillator that these circumferential adjustments of the gear teeth take place smoothly and without sudden sharp accelerations or decelerations; and I have found that normally or ordinarily tight-fitting gear teeth in the oscillator do not function satisfactorily in this regard in many high-power and highly stressed applications involving resonance. Instead, they tend to dominate the angular progression of the rotor, and thus resist or retard these circumferential adjustments. Again, the workload is often of a non-linear nature, such as in drilling or in other impacting mechanisms, causing non-linear secondary or parasitic wave forms and corresponding vibrations in the resonator and hence in the oscillator case. When the oscillator has normally fitting gear teeth, these secondary or parasitic waveforms in the resonator resulting from the non-linear load act instantaneously back through the gear teeth to exert non-linear acceleration forces on the rotor. It is of course evident that these conditions can cause highly undesirable unsteadiness in the oscillator.

The present invention ameliorates this condition, and affords a more smoothly operating oscillator, by the provision of a certain degree of circumferential clearance or lack of tightness of the intermeshing teeth on the spur and internal gears of the oscillator.

According to the invention, the gear teeth on the spur and internal gears are of such relative thickness dimensions that the successive meshing teeth on these two gears make pressure contact on only one lateral face of each, being preferably designed so that, in the running or dynamic condition, they remain at least slightly spaced or clear of one another on one side, or in any event, in the limiting case, so that each tooth feels lateral pressure on one face only, and is free of lateral pressure on the other, and so that the teeth are thus "loose," rather than tight. Preferably, in practice, at least a slight lateral or circumferential spacing or clearance between the facing but non-driving faces of the opposed teeth on the spur and internal gears is provided for the condition of dynamic operation. The invention is preferably practiced simply by reduction in the lateral thickness of the spur gear teeth, increase in the lateral spacing between the internal gear teeth, or both, so as to afford the desired lateral or circumferential spacing or gap under running conditions.

By virtue of the circumferential tooth clearance feature, the oscillator-resonator combination is thus freed from destabilizing influences arising out of high-power applications under conditions of resonance, such as may be induced by changes in load impedance, by non-linear loads, etc. It will be seen that there has been provided a circumferential accommodation for all such influences, reducing gear tooth loads from such sources when operating with a resonator. The meshing teeth actually have an "isolator" function.

The result of this invention is that I now have a successful sonic power oscillator-resonator combination of mechanical type. By the term "sonic" I mean an oscillator which will operate at sonic frequencies and loads. For example, with this invention it is now possible to cause the orbiting mass to progress around its path at such a high frequency that it can in fact cause sonic resonance of industrial elastically vibratory machinery of considerable but reasonable dimensions such as sonic pile drivers, oil well drills, material processing apparatus, and earth-working apparatus. In such cases, some component of the machine to be driven often becomes the "resonator" component of my present invention. With this new improvement, it is now possible to cause an elastic bar to elongate and contract at its resonant frequency, wherein the resonance is a function of the speed of sound through the material of the bar, and to do so in sustained commercial service. As can be appreciated, this resonant frequency is very high for most conventionally dimensioned industrial machinery. Accordingly, a very considerable advantage accrues from this invention in that I can now effectively resonate sonically various reasonably dimensioned structures, so as to accomplish extremely powerful sonic energy output; and that I can do so over long sustained time periods without generator failure. Sonic energy has great utility in a wide range of processes. In this connection, reference is made to my Patent No. 2,960,314.

As has been emphasized hereinabove, the vibration generator of the invention has unique advantage in sonic power systems operating at resonance. A full understanding of this aspect of the invention requires a consideration of certain acoustic principles and nomenclature, and which will now be set forth and explained.

By the expression "sonic vibration" I mean elastic vibrations, i.e. cyclic elastic deformations, which travel through a medium with a characteristic velocity of propagation. If these vibrations travel longitudinally, or create a longitudinal wave pattern in a medium or structure having uniformly distributed constants of elasticity or modulus, and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant;" and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutually influencing effects like equivalent factors in alternating-current electrical systems. In fact, in both distributed and lumped constant systems, mass is mathematically equivalent to inductance (a coil); elastic compliance is mathematically equivalent to capacitance (a condensor); and friction or other pure energy dissipation is mathematically equivalent to resistance (a resistor).

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, these latter do not result in the benefits of my sonic or elastically vibratory action.

Resonance in the vibratory circuit is obtained at the operating frequency at which the reactance (the algebraic sum of mass and compliance reactances) becomes zero. Vibration amplitude is limited under this condition to friction alone, and is maximized. The inertia of the mass elements necessary to be vibrated does not under this condition consume any of the driving force. It is this type of resonant operation that is utilized in the devices of this invention to efficiently achieve high-level vibratory outputs.

A valuable feature of my sonic circuits is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high force vibration) at the work point.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

All of the above mentioned characteristics of the orbiting mass oscillator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this inventon. The work process presents a special combination of resistive and reactive impedances. These circuit values must be properly met in order that the invention be practiced effectively.

Reference is now directed to the following detailed description and to the accompanying drawings, wherein the invention is disclosed in its various aspects. In the drawings:

FIG. 1 is a diagrammatic perspective illustration of a resonant vibratory system driven by a vibration generator in accordance with the present invention;

FIG. 3 is a diagrammatic view of an arrangement of spur and internal gear teeth in accordance with the invention;

FIG. 4 is a view similar to FIG. 3 but showing a modification;

FIG. 8 is a longitudinal medial section through another modified form of generator embodying the invention;

FIG. 9 is a view similar to FIG. 8 but showing another generator embodying the invention;

FIG. 10 is a somewhat diagrammatic view showing another type of generator embodying the invention;

FIG. 11 is a view similar to FIG. 10 but showing another embodiment of the invention; and FIGS. 12–19 are a series of diagrams representative of an entire group of vibration generators in which the subject matter of the invention can be advantageously used.

Reference is first directed to FIG. 1, showing somewhat diagrammatically an orbiting mass generator in accordance with the invention in combination with a resonant sonic power system, which in this case comprises a resonator in the form of a flat plate P adapted, for example, to be acoustically coupled to a liquid, not shown, in a sonic processing apparatus, and to be driven or vibrated in a sonic resonant standing wave pattern such as indicated at s, whereby to transmit powerful sound wave action into the body of liquid. As shown, a drive motor 11 drives vibration generator 12 through shaft 13, and the generator 12 is closely enclosed by a tight-fitting housing 14 which is secured to the aforementioned plate P. The generator 12 is driven by motor 11 at a resonant standing wave frequency of the plate P, causing a standing wave vibration pattern to appear in the plate, as represented at s. It will be understood that the wave pattern typically comprises a two-dimensional bending mode, of equivalent full wavelength in each direction. The vibratory or wave action undergone by the plate P is transmitted to the liquid in contact therewith to propagate a corresponding wave action through the liquid. Such an apparatus may be used in any one of a number of sonic wave processing machines, no specific example of which need be given herein. It will be understood that the apparatus of FIG. 1 is illustrative primarily of the use of a vibration generator of the type used in the present invention in a sonic power system operating at resonance, where the unique features of the generator of the present invention are uniquely significant. All of the specific generators to be disclosed are to be used in such a system, or the equivalent, in carrying out the practice of this invention.

Figure 2:
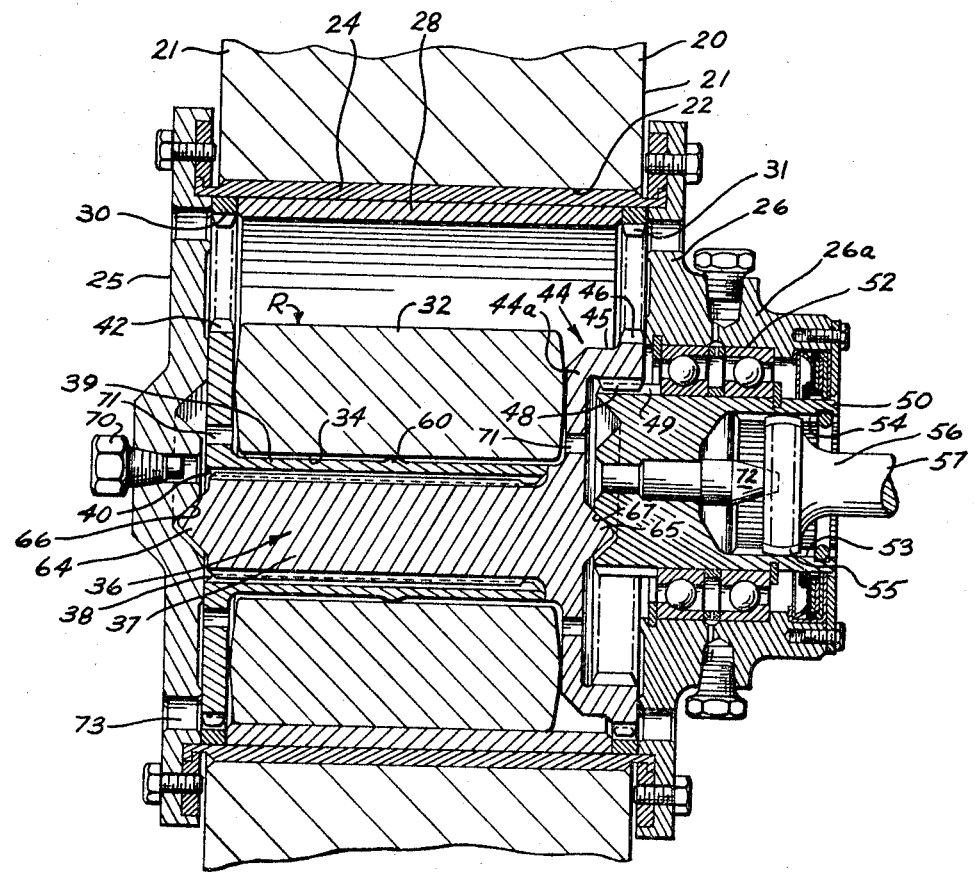
FIG. 2 is a medial longitudinal sectional view through a vibration generator in accordance with the invention, portions of the housing or body being broken away.

FIG. 2 shows a Type 1 vibration generator in accordance with the invention. The generator has a vibratory frame structure or body 20, which is the vibratory output member of the generator, and which is only fragmentarily shown herein. This generator body will be understood as generally secured tightly to the system or machine to which vibrations are to be transmitted. The body 20 may be of comparatively large mass as compared with the remainder of the generator, but not necessarily so. In this case, it is in the form of a thick plate having parallel side walls 21, and having a cylindrical bore 22 extending through it from side wall to side wall at right angles thereto. Extending through this bore 22 is a liner bushing 24, to the outer ends of which are fastened end plates 25 and 26. Inside the liner bushing 24 is a hardened steel cylindrical raceway bushing 28, and within the end portions of the liner sleeve 24, and adjacent the two ends of the raceway bushing 28, are a pair of internal gears 30 and 31. The pitch circles of these internal gears 30 and 31 are, in my preferred form of the invention, substantially the same diameter as, or close to, the internal diameter of the raceway cylinder 28. The liner bushing 24, raceway bushing 28, and the two gears 30 and 31, are all tightly fixed to the body 20 by the mounting and clamping arrangements illustrated, or otherwise as may be desired.

A relatively massive cylindrical rotor R, of somewhat lesser diameter than the internal diameter of raceway bushing 28, is located within said bushing and is adapted to roll around the inside periphery thereof in an orbital fashion, so as to exert upon the bushing 28, and the surrounding body part or housing 20, a centrifugal force. The rotor R, as here shown, comprises a cylindrical roller 32 with an axial bore 34, and is rotatable on an axle member 36 received in bore 34. The axle member 36 is in two parts, an internal shaft 37, with longitudinal splines 38 on the outside thereof, and a surrounding concentric sleeve 39, formed with internal splines 40 which mesh with the splines 38. The shaft 37 and sleeve 39 making up the axle assembly 36 thus are held against rotation relative to one another, but are capable of relative axial movement for assembly, or to accommodate any necessary longitudinal adjustment of the members 37 and 39. On one end of the axle assembly 36, the sleeve member 39 thereof has a spur gear 42, which meshes with the internal gear 30, and which may have a pitch circle of the same diameter as the diameter of the inertia roller 32, though not necessarily so. At the opposite end of the axle 36, the shaft member 37 thereof has formed thereon a cup-like part 44 whose peripheral wall 45 is formed with a spur gear 46, of the same pitch diameter as the spur gear 42, and in this instance, in mesh with the internal gear 31. The wall 45 of cup-like part 44 is also formed with an internal gear 48, and this internal gear 48 meshes at one side with a spur gear 49 on the end of a cylindrical drive member 50 which is coaxial with the raceway bushing 28. The end plate 26 has a thickened medial portion 26a, and formed therein is a bore 52 which receives bearings, as shown, for the cylindrical drive member 50. The latter has formed within its outer end portion a socket 53 formed with internal splines 54 which are engaged by arcuate splines 55 formed on a drive head 56 on the end of a drive shaft 57 driven from any suitable source of power such as an electric motor (not shown). The splines 54 and 55, as described, are capable of accommodating periodic angularity between the axis of the vibration generator and the axis of the drive shaft 57 during vibratory action of the device. The drive shaft 57 may, if desired, be afforded with universal joints (not shown).

It will be seen that the spur gear 49 in engagement with the internal raceway gear 48 is of substantially smaller diameter than the internal gear, so as to be in mesh therewith on one side only. It will also be seen that the drive member 50, and therefore the drive spur pinion 49, are coaxial with the raceway 28. Rotation of the drive gear 49 causes the internal gear 48 to roll around it, and at the same time, the spur gear 46 with internal gear 48 rolls around the internal gear 31. Correspondingly, of course, the spur gear 42 rolls around the inside of the internal gear 30. Thereby, the rotor R is caused to roll around the inside of the raceway bushing 28. Attention is drawn to the fact that the point of tangency and meshing engagement between the spur gear 49 and the internal gear 48 is on the opposite side of the longitudinal axis of the generator from the point of meshing engagement between the spur gears 42 and 46 and the respective internal gears 30 and 31. This relationship, which is the characteristic of the Type 1 generator disclosed herein, has a significance that will be stressed hereinafter. The roller 32 of the rotor R is rotatable on the outside of the sleeve member 39, and to reduce the area of rolling contact, and thereby minimize friction, the sleeve member 39 is preferably formed, midway of its length, with a convex bearing bead 60 which engages the interior surface of the bored roller 32. For reduction of sliding friction between the ends of the roller 32 and the gear 42, on the one hand, and the radially extending portion 44a of the cup member 44, on the other, the opposite end portions of the roller 32 are shaped to contact the members 42 and 44a only within a restricted area, as clearly illustrated.

Recalling that the inertia rotor R is required to roll around inside the raceway bushing 28, it will be seen that centrifugal force holds the rotor in contact with the raceway bushing 28 when the generator is up to speed, but that when the generator is at rest, or just coming up to speed, some means is desirable for holding the roller against the raceway in position other than at the bottom of the latter. To this end, the shaft 37 is provided at opposite ends with conical projections 64 and 65 and these engage frustoconical surfaces 66 and 67, respectively, formed respectively on the end cap 25 and the drive member 50.

It is important that the generator be effectively lubricated, and while lubrication means may vary widely, I here show a lubricant hose-coupling-plug 70 threaded into end cap 25 and adapted to supply lubricant into the interior of the generator. This lubricant spreads throughout the interior of the generator, and to aid in distribution, holes 71 are formed in spur gear 72 and the radial part 44a of gear cup 44. A bored pin 72a is fitted in drive member 50 and conveys lubricant to the interengaged drive splines 54 and 55. The mist may escape through vent holes 73.

In operation, rotation of drive shaft 57 turns driver 50 and drive spur gear 49 on the axis of the cylindric raceway, and the drive spur gear 49, being in engagement with internal gear 48 on one side of the latter, i.e., at a point of tangency between the two, causes rotation of gear 48. The spur gear 46, which I term a "phasing gear," being integral with the thus driven internal gear 48, then rolls around the inside of stationary internal raceway gear 31, with which it meshes at its point of tangency diametrically opposite from the point of tangency between the gears 49 and 48. At the same time, the spur gear 42, also a phasing gear, rolls around inside of stationary internal gear 30, also meshing with said gear 30 in the same manner and place as does the gear 46 with the internal gear 31. The axle assembly 36 and cylindrical roller 32 rotatably mounted thereon thus gyrate, with the roller 32 rolling around the inside of cylindrical raceway 28. When the generator is up to speed, centrifugal force developed by the rotation or gyration of the rotor R comprised of the roller 32 and its axle causes it to bear with considerable pressure against raceway bushing 28. A good non-slipping, rolling engagement is thereby attained. The roller 32 rolls around the inside of raceway bushing 28 substantially in step with the progression of the spur gears 42 and 46 around the internal gears 30 and 31, respectively. Any tendency for roller 32 to travel with a different rate of rotation on its axis from that of the spur gears 42 and 46 on the axis of the latter is accommodated by relative rotation of roller 32 and the axle assembly 36.

The centrifugal force developed by the relatively massive inertia rotor R rolling in its orbital path around the inside of the raceway or raceway bushing 28 results in the exertion of a large gyratory force on the raceway 28 and therefore on the housing or body member 20. This gyratory force is transmitted from generator body 20 to whatever device is to be subjected to this periodic gyratory force.

Returning now to the meshing spur and internal gears 42 and 30, and 46 and 31, and referring back to the introductory discussion, it is a very important feature of the invention, in all cases in which the generator is to operate under conditions of high performance, i.e., at high speed, or high loading, and is driving a sonic resonant system, that the gear teeth of these paired or mating spur and internal gears have a circumferential or lateral clearance feature, as explained hereinabove, when the generator is in operation. In this connection, it is not quite obvious, and should be made clear, that with ordinary gear design, and using modern involute gear teeth of standard form, the gear teeth of the pairs of spur and internal gears 42, 30 and 46, 31 will run tightly under the dynamic operating conditions of the present generator because of the large centrifugal force generated at working frequencies, e.g., sonic frequencies, in resonant systems. This is because the centrifugal force generated under such conditions is often very high and therefore acts to take up all radial tolerances and clearances; and, moreover, the rotor, being forced strongly against the raceway bushing, is subject to a small but important elastic diametric compression, so that the gear teeth on the spur gears enter unexpectedly far into the spaces between the teeth of the internal gears. Thus under these conditions, without special countermeasures being taken, the spur teeth engage at both their front and rear surfaces, like wedges, between the internal gear teeth, and thus impose heavy radial loading on the gear teeth such as leads to undue friction, heating, and premature wear and failure. Even more importantly, however, circumferential gear teeth clearance and looseness are thereby lost, so that, as explained hereinabove, the natural automatic load adjustment feature of the orbiting-mass type of oscillator working into a resonator and load is substantially inhibited. These undesirable conditions are prevented, as discussed earlier, by use of relative gear tooth dimensioning that permits, under dynamic running conditions, with full development of centrifugal loading, gear tooth pressure on one face only of each gear tooth, and preferably a slight actual clearance at the other. The best practice of the present invention is considered to involve an actual substantial spacing gap between the rearward face of each spur gear tooth and the front face on the following internal gear tooth under dynamic conditions.

The desired dynamic gear tooth geometry referred to in the preceding paragraph is achieved according to the invention by providing that the thickness of the spur gear teeth, measured, say, along the pitch circle, is restricted to a dimension which preferably leaves an actual gap between the rearward face of an engaged spur gear tooth and the internal gear tooth immediately in back thereof under dynamic conditions, with full centrifugal force loading on the roller. This of course means that a still larger such gap exists in the static condition. Thus, in accordance with the preferred practice of the invention, a relative large gap is provided for the static condition, which gap is reduced, but still exists as a definite physical spacing, in the dynamic condition when, with centrifugal force loading, the spur gear teeth are forced and displaced radially outward so as to penetrate deeper between the teeth of the internal gear. The radially outward displacement of the spur gear teeth will thus be understood to to be limited in the first instance, as the generator is started up, by the engagement of the inertia roller 32 against the raceway bushing 28, but then w ith further incremental outward radial displacement owing to removal of tolerance and clearance distances and to diametrical elastic compression of the roller under high centrifugal force at full operating speed. FIG. 3 illustrates, with exaggeration, the preferred dynamic condition, with definite gap $x$ between meshing spur and internal gear teeth $t$ and $i$, respectively. The condition of FIG. 3 is accomplished, according to the invention, by having the spur and internal gear teeth slightly less deeply meshed in the static condition, with a still larger gap at $x$. By the static condition, I mean with the generator stationary, and with the inertia roller in light contact with the raceway. The spur gear teeth then go more deeply into the spaces between the internal gear teeth in the dynamic condition, for reasons already described; and, in the preferred practical practice of the invention, the spur gear tooth thickness dimension is restricted, in initial design, to a magnitude which assures preservation of an actual physical gap $x$ in the dynamic condition, as represented diagrammatically in FIG. 3. In FIG. 4, which again is a somewhat exaggerated diagram, the purpose of the invention is served slightly differently, by using a more normal (greater) spur gear tooth thickness, but by having the inertia roller engage the raceway before the spur gear teeth are quite so deep between the internal gear teeth as in the case in FIG. 3. A gap $x$ is thereby again provided for the dynamic running condition.

It will be seen that the preferred tooth geometry of FIG. 3 may be described by saying that the tooth thickness dimension of the spur gear teeth $t$ is reduced to obtain the tooth face gap at $x$ for the dynamic condition. It will be understood that the same effective result is obtained by increase in the spacing between the internal gear teeth, and for the purpose of the invention, the two approaches are equivalents.

Figure 5:
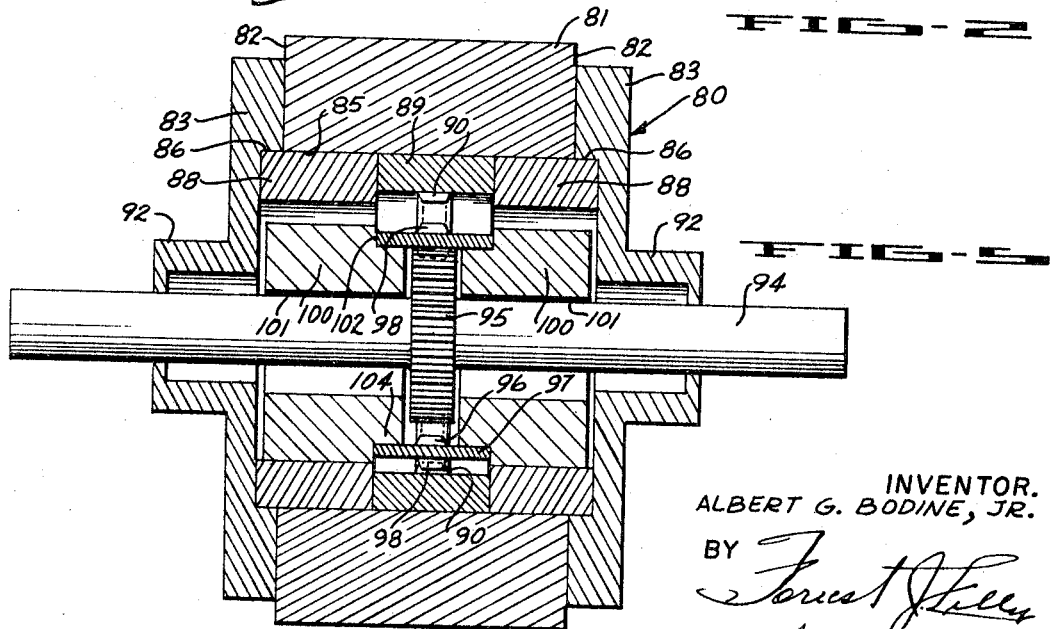
FIG. 5 is a longitudinal medial through another vibration generator in accordance with the invention.

Reference is next directed to FIG. 5, showing another embodiment of the invention, being again a Type 1 generator. An exterior housing 80 is made up a central body member 81 having flat parallel sides 82, and a pair of end plates 83 engage the opposite side surfaces of body member 81. A cylindrical bore 85 extends transversely through body member 81, and this bore 85 is extended at each end by counterbores 86 in end plates 83. Two hardened, axially-spaced raceway rings 88 are placed in the bore 85 and seat into the counterbores 86. These rings 88 are axially spaced to accommodate a ring 89 formed with an internal gear 90. The latter may have a pitch circle of a diameter close to or equal to the internal diameter of the raceway rings 88, in correspondence to the relationships heretofore set forth in connection with the embodiment of FIG. 2. End plates 83 have central hub portions 92 affording bearings (only diagrammatically represented in FIG. 5) for a drive shaft 94 which is coaxial with the bores of the raceway rings 88 and with the internal gear 90. Fixed on this drive shaft 94 is a drive spur gear 95, which meshes on one side with one side of a somewhat larger internal gear 96. The internal gear 96 is on the inner periphery of a cylindrical gear ring 97, on the outer periphery of which is formed a spur gear 98 which meshes on one side with the aforementioned internal race gear 90. The spur gear 98 is therefore smaller than internal gear 90, as shown.

A pair of inertia rotors or rollers 100, formed with coaxial internal bores 101, surround the drive shaft 94 and are located on opposite sides of spur gear 95. These rollers 100 are adapted to roll around the inside surfaces of the race rings 88. Their ends adjacent to the ring 97 and spur gear 95 are shouldered, as indicated at 102, to provide reduced end portions 104 which are rotatably received, i.e., with a free slip-fit, inside the ring 97. Thus, the rollers 100, the gear ring 97, and the external spur gear 98 are coaxial with one another. The outside diameter of the rollers 100 is made close to or exactly equal to the pitch diameter of the spur gear 98, in accordance with principles already taught in connection with the embodiment of FIG. 2.

Attention is directed to the fact that the diameter of the spur gear 98 is somewhat close to the diameter of the internal gear 90. It is well known that in such cases, using involute gear teeth, the gears can be meshed only by moving them together parallel to their axes, and that when once meshed, they can not be separated radially. This characteristic assures that the spur gear 98 will roll around up and over the internal gear without separating therefrom, and comprises a gear guiding means which substitutes for the elements 64 to 67 utilized in the generator of FIG. 2.

The operation of the generator of FIG. 5 is essentially the same as that of FIG. 2. Rotation of drive shaft 94 and of input spur gear 95 thereon causes rotation of internal gear 96 with which spur gear 95 is in mesh on one side. Thus internal gear 96 is caused to rotate, as is the gear ring 97, and the spur gear 98 formed on the outside of gear ring 97. The spur gear 98 is thus caused to roll around the inside of stationary internal gear 90, with which it meshes at its point of tangency diametrically opposite from the point of tangency between the gears 95 and 96. The inertia rollers 100, coaxial with an rotatably associated with the gear ring 97, simultaneously roll around the inside surfaces of the race rings 88, describing a gyratory, orbital movement path. Being in engagement with the interior bearing surfaces of the race rings 88, the rollers 100 may tend to rotate or creep relatively to the gear ring 97 and the spur gear 98 which is in mesh with the internal gear 90, and this is enabled by the rotative fit between the rollers 100 and the ring 97.

The inertia rollers 100 are again of substantial mass and inertia, and when the generator is up to speed, these rollers 100 develop a substantial centrifugal force which is exerted against the race rings 88, and which is transmitted from the latter to the housing body, including the body 81, and the end plates 83. This force will be understood to be transmitted to any device to which the generator housing may be secured, as in the case of FIG. 2.

The generator of FIG. 5 also incorporates, when intended for high-power, high-stress, or sonic-power applications under conditions of resonance, the previously described feature according to which, as taught in connection with FIG. 2, the spur gear 98 (the phasing gear) is given such dimensions and geometry relative to the internal gear 90 as to preserve, under dynamic running conditions, a lateral gap or clearance between the rearward surface of each spur gear tooth and the forward surface of the immediately following internal gear tooth.

It will be noted that a unique characteristic of the generator of FIG. 5 is that the input gear 95 in central of the inertia roller means 100. This design has a desirable symmetry, as regards the application of driving force to the roller means from the input gear.

Figure 6:
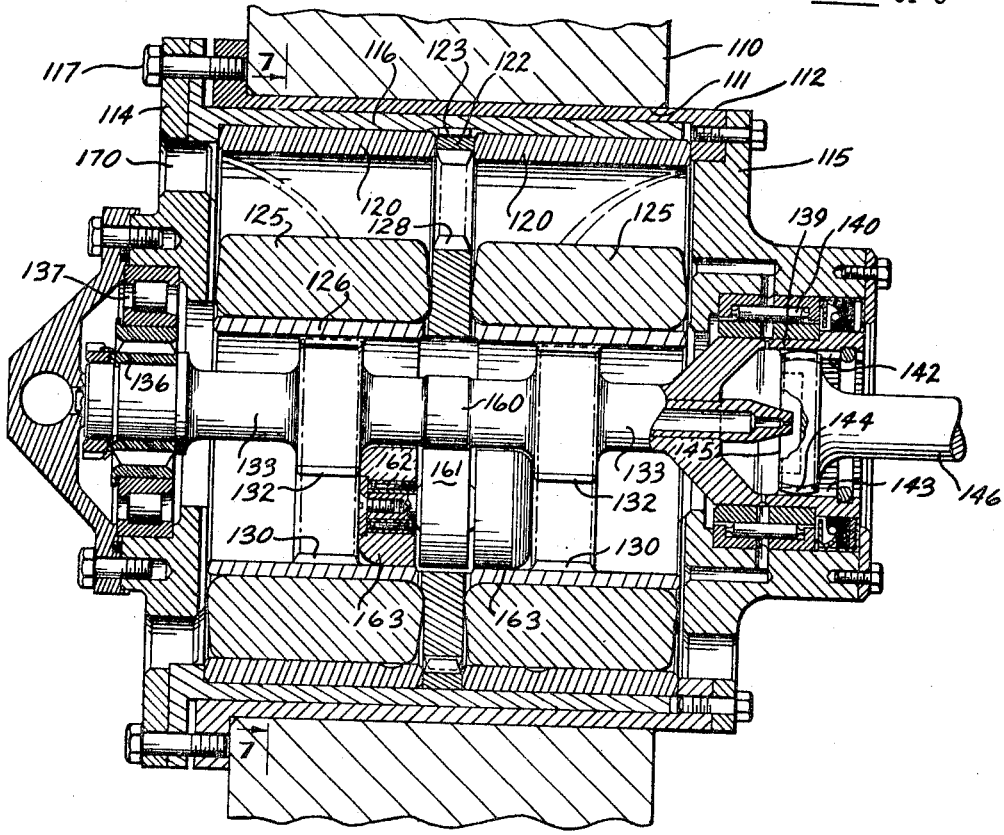
FIG. 6 is a view similar to FIG. 3 but showing a modification.
Figure 7:
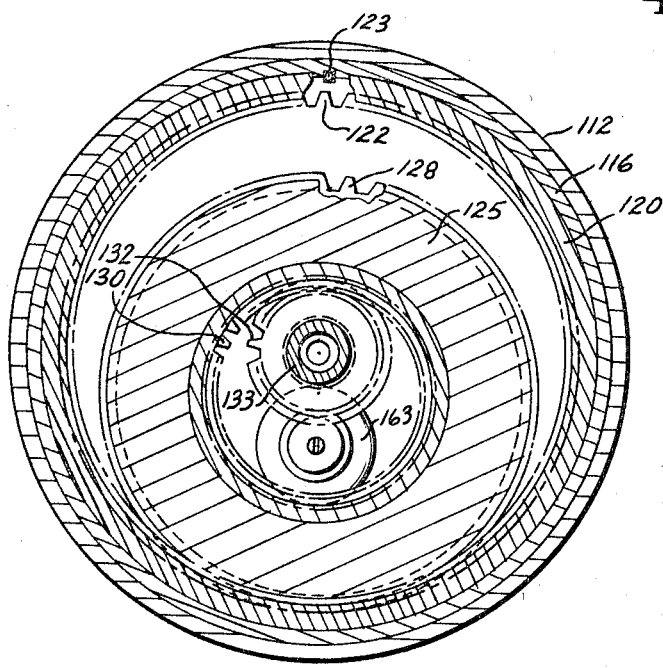
FIG. 7 is a transverse sectional view taken on line 7—7 of FIG. 6.

Another generator of this same type, but more elaborate in design, is shown in FIGS. 6 and 7, to which reference is now directed. The generator has a vibratory frame structure or body 110, only fragmentarily shown, and which may be generally like that of FIG. 2, being formed with a cylindrical bore 111, similar to the bore 22 of FIG. 2. In this bore 111 is a liner bushing 112, to the outer end portions of which are secured end plates 114 and 115, and a bushing 116 located inside the liner sleeve 112 is secured to end plate 114 and to the liner sleeve 112 as by means of screws 117, as clearly shown. Tightly fixed inside bushing 116 are two cylindrical, axially spaced, hardened raceway rings 120, and fitted between the opposed ends of these raceway rings is an internal gear 122, whose pitch diameter may be that of the internal diameter of raceway rings 120, or may depart slightly from the latter, depending upon individual design. The internal gear 122 is keyed to the bushing 116 as indicated at 123. A pair of generally cylindrical inertia rotors 124, of somewhat lesser external diameter than the internal diameter of the raceway rings 120, are placed inside the latter and are adapted to roll therearound. These rotors comprise cylindrical rollers 125 of large mass and inertia and a gear sleeve 126 onto which they aer rotatably fitted. Gear sleeve 126 has a medial spur gear 128 between the two rollers 125, which meshes with the internal gear 122. The pitch circle of the spur gear 128 may be exactly equal to the external diameter of the rollers 125, or may depart slightly therefrom, depending upon individual design, in accordance with principles discussed elsewhere herein. The inertia rollers 125 are rotatably mounted on the gear sleeve 126, and also have rotative end contact against the sides of the spur gear 128. At the opposite ends, the rollers 125 are confined by the interior walls of end plates 114 and 115.

Gear sleeve 126 has formed therein, on opposite sides of the spur gear 128, internal gears 130, which mesh with smaller spur gears 132 on a drive shaft 133 that is journalled coaxially with the cylindrical raceway formed by the raceway rings 120.

The left-hand end of drive shaft 133, as viewed in FIG. 6, has mounted thereon an annulus 136, which is journalled by means of a roller bearing at 137 fitted into end plate 114. The opposite end portion of the drive shaft 133 is enlarged into a cylinder head 139 which is journalled in end cap 115 by a needle bearing 140, and which is formed in its end with a socket 142 containing splines 143 meshing with arcuately formed splines 144 on a drive head 145 on the end of rotatable external drive shaft 146 powered from any suitable source (not shown).

The spur gear 128 and inertia rollers 125 require support against the internal gear 122 and raceway rings 120, respectively, while the generator is coming up to speed, the same as do the generator forms previously described. In this case, the means for so doing comprises a ground cylindrical surface 160 raised medially on drive shaft 133, in engagement with a cylindrical roller 161, which roller 161 has axial stub-shaft portions 161a which are journalled axially, as by needle bearings at 162, on two rollers 163 located on opposite sides of roller 161 and adapted to make peripheral contact with the inside of gear sleeve 126. There is clearance between the rollers 163 and the shaft 133, as shown, and there is also clearance space between the periphery of the roller 161 and the gear sleeve 126. Accordingly, the roller assembly as described holds the gear sleeve 126 in its eccentric, operating position relative to the shaft 133 at all times, with the sleeve 126 thus holding the inertia rollers 125 always against the internal raceway surfaces of the race rings 120.

The drawings show certain provisions for conveying a lubricant mist into the interior of the generator, and the end plate 114 has holes 170 therein by which this mist must escape, so as to avoid accumulation of lubricant inside the generator. These lubricant provisions form no part of the present invention, and therefore need not be further described herein.

Operation is as before, the external drive shaft rotating the internal axial drive shaft 133 by the splined connection at 143, 144, and the drive shaft 133 turning its spur gears 132 which are in mesh with the internal gears 130 in gear sleeve 126 so as to rotate the latter. The gear sleeve 126 has its spur gear 128 in mesh with one side of the fixed internal gear 122, so that the gear 128 rolls around the inside of the gear 122, causing the rollers 125 to roll around the inside of the raceway rings 120, in general, just as in the embodiments heretofore discussed. The principal difference here is the use of the rotor assembly 161, 163 for maintaining the spur gear 128 in mesh with internal gear 122 and the inertia rollers 125 in engagement with the raceway rings 120. The generator of FIGS. 6 and 7 has the unique advantage that the entirety of the internal drive shaft 133 and the driving spur gears 132 are inside the gear sleeve 126 which in turn is inside the inertia rollers 125.

Circumferential gear tooth clearance for the teeth of the internal gear 122 and the spur gear 128 under dynamic running conditions will be understood to be provided, all as discussed hereinabove in the introduction to the specification as well as in connection with FIGS. 2 and 5.

There will now be described illustrative embodiments of Type 2 generators, which will be recalled to lend themselves to higher step-up gear ratios than the Type 1 generators. It is to be understood that each of these incorporates the important circumferential gear tooth clearance feature of the invention discussed above in connection with the Type 1 generators. This feature is to be understood as incorporated in all of the generators described hereinafter as a preferred feature thereof, and one which is very important in high-stress applications involving high sonic power and resonance. However, it is also to be understood that in less demanding situations, this feature may be omitted, and the generators to be discussed have certain features of invention irrespective of this particular feature. With this understanding, two Type 2 generators will be described.

Referring now to FIG. 8, numeral 200 designates generally a housing member with opposite end faces 201 and 202, and provided with a main transverse bore 204 extending inwardly from face 201 nearly to the opposite face 202, and with a coaxial counterbore 206 extending to a juncture with bore 204, so as to afford a seating shoulder 207. An end plate 208 is fastened to housing member 200 against the face 202 of the latter, and this end plate 208 has a hub portion 209 adapted to accommodate certain bearings and other parts described later.

Positioned medially in bore 204 is a liner and back-up sleeve 210. This sleeve 210 snugly receives a pair of axially spaced, hardened, raceway rings 212, between which is internal gear 214. Said gear 214 is fixed against rotation relative to liner sleeve 210 by means of a key as indicated at 215. Raceway rings 212 and the sleeve 210 are placed between two raceway side rings 217 and 218, the latter seating against shoulder 207, while the former is engaged by a clamp ring 219, which is forced inward by assembly screws 220 which pass first through end plate 222, then through the clamp ring 219, and then thread into the housing part 200. It will be clear that tightening of these assembly screws 220 clamps the raceway liner sleeve 210 so as to hold the latter against rotation, and also compresses raceway rings 212 and the gear 214 to hold these members against rotation. These raceway side rings 217 and 218 are preferably provided with a number of holes 224 in proximity to the internal raceway surface of the rings 212 in order to provide for easy escape of oil or oil mist from between the later described inertia rollers and the raceway rings 212.

The aforementioned end plate hub 209 contains a roller bearing assembly 225, which journals a gear sleeve 226 in a position coaxial with the raceway defined by the raceway rings 212. The inner end of gear sleeve 226 is formed with an internal gear 228, which meshes at one side with a smaller spur gear 229. Said gear 229 is one end of the inner sleeve member 230 of an axle or hub assembly generally designated by the numeral 231. This hub assembly includes an outer gear sleeve 232, and the sleeves 230 and 232 are axially slidable relative to one another, but keyed together against relative rotation by means of intermeshing splines as indicated at 234. The gear sleeve 232 engages the spur gear 229 at one end, and is engaged at the other by an annular head 235 on the outer end of a cylindrical plug 236 that slips inside the outer end portion of the aforementioned sleeve 230. A screw 238 threaded into the central hub portion of spur gear 229 passes through the plug 236 and draws it towards the right, as viewed in FIG. 8, so as to hold the associated members in assembly. Also, the hub portion of spur gear 229 has a coaxial pin 239, which is peripherally engaged by a pin 228a coaxially formed on gear sleeve 226. These pins support the rollers 242 adjacent the raceway rings 212 when the generator is stationary, or coming up to speed.

Gear sleeve 232 has a medial spur gear 240, of somewhat smaller diameter than the internal gear 214, and meshes with the latter on one side. Inertia rollers 242 are rotatably mounted on the gear sleeve 232, on the two sides of spur gear 240, and are aligned to run around raceway rings 212. It will be seen that, as in earlier described forms of the invention, the total centrifugal force developed is owing to the mass of the entire orbiting "rotar," which in this case is composed of the gear sleeve 232, spur gear 240, the sleeve 230, members 236 and 238, and the inertia rollers 242. Attention is particularly directed to the fact that the internal gear 228 and the spur gear 229 mesh with one another on the same side of the central axis of the raceway rings 212 as do the spur gear 220 and the internal gear 214. It will be recalled that this is the reverse of the arrangement found in the generators heretofore described. Of these gears, internal gear 228 is the drive gear, gear 240 is what I term the phasing gear, and internal gear 214 is the raceway gear.

In a preferred form, the pitch circle of the internal gear 214 coincides with the internal diameter of the raceway rings 212, or very neraly so, and the diameter of the pitch circle of the spur gear 240 coincides with the external diameter of the inertia rollers 242, or very nearly so. In any event, in accordance with principles explained above, preferably, or in all cases for high-stress applications, the gear tooth dimensions and geometry are made such that the loading owing to centrifugal force of the gyratory assembly of inertia rotors 242, spur gear 240, etc., is borne by the engagement of the inertia rollers with the raceway rings 212, with all radial loading of the internal gear 214 by the spur gear 240 avoided.

The gear sleeve 226 which carries the internal drive gear 228 is itself driven through internal splines 243 engaged by arcuate splines 244 on a drive head on the end of a drive shaft 245, which will be understood to be rotated from any suitable source of power. An end cap 246 secured to the end of hub 209 encloses the bearing 225, and is shown as furnished with packing 247 for a sleeve member 248, only fragmentarily here shown, which surrounds the drive shaft 245.

In operation, gear sleeve 226 is driven by drive shaft 245, and rotates internal drive gear 228. Spur gear 229 in mesh with internal gear 228 therefore rotates on its axis, and the spur gear 240 is thereby caused to roll around the inside of the internal gear 214, with the inertia rollers 242 correspondingly rolling around the inner surfaces of the raceway rings 212. As in earlier described embodiments, any differences tending to occur between the rates of rotation of the spur gear 240 and the inertia rollers 242 are accommodated by relative rotation of the rollers 242 on the gear sleeve 232. Gyratory vibratory action is thereby exerted on the housing member 200, and to any part to which the member 200 may be secured.

The generator of FIG. 8 has an advantageous form and arrangement in that it need utilize but a single phasing gear 240, placed medially, in a symmetrical location, between two inertia rollers 242. Forces are thereby well balanced and the generator exceedingly well stabilized. It is therefore especially suited to high-power service.

Reference is next directed to FIG. 9, showing a unique gearing arrangement including provision for a step-down gear ratio from the initial power shaft to the generator drive gear. The generator is of Type 2. A housing body 250 is medially and transversely split into two halves 250a and 250b, and in these halves are coaxial raceway bores 251 and 252, containing hardened raceway liner sleeves 253. The two body halves 250a and 250b are counterbored, concentrically with the raceway bores 251, so as to form a medial body cavity 255 of circular outline for certain gears presently to be mentioned. This body cavity 255 is continued upwardly as at 258, into an upward extension 257 of the housing designed for accommodation of the initial step-down drive gear means.

In this case, the internal drive gear is designated at 260, located in body cavity 255, and thus, as will be seen, is located in the center of the oscillator. To make this possible, the internal gear 260 rides on a surrounding large-diameter ball bearing 262 characterized, preferably, by use of small bearing balls, and the outer stationary race ring of this bearing 262 is seated inside a cylindrical flange 264 projecting from an internal ring gear 265 which constitutes one of a pair of race ring gears 265 and 266 located in the bottoms of the counterbores forming the body cavity 255, and affixed tightly therein by any suitable means. These internal gears 265 and 266 have pitch diameters which may be approximately equal to the internal diameters of the raceway sleeves 253, as in other versions of the generator described herein. The internal gears 265 and 266 mesh with somewhat smaller spur gears 270, which are on the inner ends of gear sleeves 271 forming the outer elements of axle assemblies 272. The inner elements of these axle assemblies comprise shafts 274 which are longitudinally slidable relative to the sleeves 271, but made non-rotatable relatively thereto by means of splines such as indicated at 276. The shafts 274 project oppositely from a spur gear 278 contained in the space between the two spur gears 270, this spur gear 278 being in mesh with the aforementioned internal drive gear 260.

The internal drive gear 260 has, to one side of bearing 262, a radial wall extending outwardly to a spur gear 280, which is in mesh with a spur pinion 281 in body cavity extension 256. The spur pinion 281 is on a drive shaft 282 turning in bearings 284 supported in body housing part 250b. The raceway cavities are closed by side plates 286 secured to the sides of body halves 250a and 250b, and circular channels of V-shaped cross-section 288 receive and guide conical and coaxial projections 290 on the extremities of shafts 274, serving a purpose described in earlier embodiments of the invention.

The drawings show also certain provisions for lubrication, but since these form no part of the present invention, and are subject to wide variation, no detailed description will be included herein on these arrangements.

Operation is substantially as in the preceding embodiment, with the power input coming in via shaft 282 and meshing spur gears 281 and 280 in the central plane of the generator. These drive what I refer to as the drive gear of the generator, namely the internal gear 260. The latter causes rotation of spur gear 278, and therefore of spur "phasing" gears 270. As in earlier embodiments, the rotating phasing gears 270 roll around the inside of the internal raceway gears 266, with inertia rollers 277 thereby constrained to roll around the inside of the raceway rings 253. Gyratory vibration is thus generated in the body housing 250, as in earlier described embodiments.

Attention is drawn to the fact that the spur gear 278 is, in this embodiment, fairly large relative to the internal gear 260 which drives it. As will be brought out further in subsequent discussion, this leads to an overall step-up drive ratio. The initial drive is via the small spur gear 281 on the drive shaft 282, leading to a fairly large diameter spur gear 280, which is then fixed to the internal drive gear 260. This gearing design adapts the oscillator to a high-speed input shaft.

Vibration generators or oscillators of the kind discussed herein are of two general types, and each type may be arranged in four distinct configurations. Type No. 1 is a low-ratio design in which the frequency of vibration relative to the input shaft rotation varies, within practical limitations of gear size and design, from about 1 to 5 step-down to 5 to 1 step-up. Type No. 2 is a high-ratio design in which the frequency of vibration relative to the input shaft rotation varies from about 2 to 1 step-up to a theoretical infinite step-up, this also being limited by practical gear design. These oscillators have either a roller running inside a circular race, or a ring whirling about a central, circular pin.

Several examples of oscillators involving a roller running inside a circular race, in both Type 1 and Type 2 forms, have already been given. Two pin and ring oscillators, one a Type 1 and one a Type 2, will now be described, and reference is first directed to the Type 1 generator shown diagrammatically in FIG. 10. Numeral 300 designates a shaft projecting from a fragmentarily indicated body, housing or frame 301, and which will be understood to be the body in which gyratory vibration is to be set up. Formed around or fixed on the end of shaft 300 is a spur gear 302, and the spur gear may have a pitch diameter substantially equal to that of the shaft 300. A whirling ring 304 is arranged to whirl, spin or gyrate on the shaft 300, like a hoop on a stick. The ring 304 is, of course, as shown, of somewhat larger diameter than the shaft 300. Also, the ring 304 has an internal gear 306 which meshes with the spur gear 302 on shaft 300, and the inside surface 307 of ring 304, to the side of internal gear 306, has a diameter substantially equal to that of the pitch diameter of the internal gear. The surface 307 runs on the surface of the shaft 300, while internal gear 306 inside the ring runs on the spur gear 302 on the fixed shaft 300. In correspondence to the forms of the invention already described, gear tooth forms and dimensions used are such as to afford the circumferential or lateral tooth clearance feature between the teeth of the gear 302 and the teeth of the internal gear 306. This is accomplished, preferably, by using gear tooth thicknesses on the teeth of the spur gear 302 and internal gear 306 such that gaps are afforded between the forward faces of the gear teeth on the gyrating internal gear and the adjacent faces of the stationary spur gear teeth, with these gaps being sufficient that they are still preserved during high-speed whirling of the ring under, for example, resonant frequency operation.

The ring 304 is on a frame or spider 308, to which is secured a coaxial spur gear 310. This spur gear 310 meshes with internal gear 312, which is coaxial with shaft 300, and which is driven by drive shaft 314.

In operation, the shaft 314 rotates drive gear 312, which causes rotation of spur gear 310, and therefore also of frame or spider 308 and of internal gear 306. Thereby, the internal gear runs around the gear 302 on the extremity of the shaft 300, and ring 304, in result, spins about the shaft 300, developing centrifugal force which is exerted from the ring on the shaft 300. The shaft 300 is thereby set into gyratory vibration, which is transmitted to the body or housing 301, and thence to any device to which the body 301 may be secured or coupled.

Reference is next directed to FIG. 11, showing another pin and ring generator, but this time of Type 2. In this embodiment, there is again an inertia ring rolling around a pin, with internal gear teeth in the ring and spur gear teeth around the shaft. The gear tooth and pitch circle relationships discussed in connection with FIG. 10 apply equally here, and no further discussion thereof is accordingly necessary.

In this case, there is again a shaft, here designated at 320, projecting from a body, housing or frame 321, and having at its extremity a spur gear 322. Running around this spur gear, and the surface of shaft 320 immediately adjacent thereto, is an inertia ring 324, corresponding exactly to the inertia ring 304 of FIG. 10. This inertia ring is on a frame or spider 325, which carries also an internal gear 326 concentric with the internal gear 324. Meshing with the internal gear 326 is a drive gear 328, which is a somewhat smaller diameter than the internal gear, and which is driven by drive shaft 329 coaxial with shaft 320.

The operation here is exactly similar to that of FIG. 10, with the sole exception that the internal gear 324 is driven through an internal gear 326 from a coaxial spur gear on a coaxial drive shaft. This makes the generator of FIG. 11 a Type 2 generator, having higher step-up drive-ratio capabilities.

The various drive-ratio possibilities of the several forms of the generator will now be considered in more detail. There are two roller and two whirling-ring configurations in each type, a total of eight, which are illustrated diagrammatically in FIGS. 12–19. The basic difference between the two types is that in the first, low-ratio design, the driving force is applied to the ring or roller at a point opposite the point of contact of the ring or roller with its race, and in the second, high-ratio design, the driving force is applied at a point on the same side of the center of the oscillator race as the point of contact of the ring or roller with that race. In both types the total gearing consists of two sets of spur and internal gears, one set having the pitch diameter of the race and roller or pin and ring, as the case may, and the other having a choice in size, depending upon the vibration-to-drive ratio desired, but limited, because of the geometry of the system, to a difference in pitch diameter equal to that of the race and roller (or ring) gear set.

In FIGS. 12–19:

$r_1$=race (or pin) gear radius,
$r_2$=roller (or ring) gear radius (phasing gear),
$r_3$=roller (or ring) drive gear radius,
$r_4$=input gear radius, $S$=ratio between roller (or ring) tips around the race (or pin) and one input gear rotation. A negative value indicates that the direction of rolling on the race (or pin) is in the opposite direction to the motion of the drive gear. Variations in S for a given set of values of $r$ in the eight configurations are shown.

For Type 1 oscillators, $S_1$ in terms of the four radii is:

$$S_1 = \frac{r_2 r_4}{r_2 r_4 - r_1 r_3} = \frac{1}{1 - \frac{r_1 r_3}{r_2 r_4}}$$

This may, however, also be expressed in terms of the ratio, G, between the roller trips around its race, and one roller rotation, or the equivalent spur and internal gear set. There are two gear sets involved, represented by the gear radii $r_1$ and $r_2$, and $r_3$ and $r_4$, respectively. Hence, with appropriate subscripts, $$G_{12} = \frac{1}{1 - \frac{r_1}{r_2}} = \frac{r_2}{r_2 - r_1}$$

for race and roller, or pin and ring $$G_{34} = \frac{1}{1 - \frac{r_3}{r_4}} = \frac{r_4}{r_4 - r_3}$$

for roller drive gear and input gear, or ring drive gear and input gear. We have then that $$S_1 = \frac{G_{12} G_{34}}{G_{12} + G_{34} - 1}$$

For Type 2 oscillators, $S_2$ in terms of the four radii is:

$$S_2 = \frac{r_2 r_4}{(r_2 - r_1)(r_4 - r_1)}$$

and this may also be expressed in terms of the individual gear set ratios G except that whereas $$G_{12} = \frac{1}{1 - \frac{r_1}{r_2}} = \frac{r_2}{r_2 - r_1}$$

is the same race and roller set as before, we have $$G_{14} = \frac{1}{1 - \frac{r_1}{r_4}} = \frac{r_4}{r_4 - r_1}$$

is the ratio between the race (or pin) and the input drive gear (spur or internal) and these do not run together, as a set and are not, therefore, limited by practical considerations of meshing gears. When $r_1$ and $r_4$ approach the same size the step-up ratio becomes infinite. We have then that $S_2 = G_{12} G_{14}$.

For either type of oscillator, if S is known, the input drive gears can be selected only after the race and roller sizes have been determined, and this requires some consideration of the specific oscillator application. The maximum impulse from a given roller is obtained when $$r_2 = \frac{2}{3} r_1$$

but it is generally desirable to keep the angular velocity of the roller in the race as uniform as possible to keep the output as nearly sinusoidal as possible, and for this reason the roller may be preferably be made heavier by increasing its radius as well as its length. The increase of radius reduces the value of D, where $D = r_1 - r_2 = r_3 - r_4$ and this in turn affects the final gear selection, because with standard gears, the minimum D is given by $2D = 8/P$ where P=diametrical pitch of the gears selected. When the desired impulse M of the oscillator is known, where $$M = 2.84 \times 10^{-5} \, W D n^2$$

where W=weight of roller in pounds, $n$=roller tips around race per minute and the values of $r_1$ and $r_2$ have been selected together with a value of D that will give a gear that will transmit the H.P. requirements of the oscillator, then we may calculate the size of the input gears from the relations $$r_4 = \frac{S_1 r_1}{G_{12} - S_1}$$

$$r_3 = r_4 - \frac{r_2}{G_{12}}$$

for Type 1 oscillators. These may not turn out to fit the selected gear pitch, so we start with the smallest gear (unless this is already $r_1$ or $r_2$) and take the relations $$\frac{r_2}{r_4} = \frac{G_{12}}{G_{34}}$$

and $$r_4 = \frac{-8}{2P} G_{34}$$

and work back, to determine $r_1$ and $r_3$ after $r_4$ and $r_2$ are selected. In the event that a finer pitch gear is selected than that which gives an 8-tooth difference for the smallest internal gear set, more latitude in design is possible. In any event, after the four radii are selected, the final value of $S_1$ can be calculated from these. It is difficult, and sometimes impractical, to obtain a particular value of S, but a combination can always be found that approaches it.

It is of interest to not that for Type 1 designs, when $S_1 = -1$ (a one-to-one ratio) that $$G_{12} = \frac{1 - G_{34}}{1 + G_{34}}$$

or in general $$G_{12} = \frac{S_1 (1 - G_{34})}{S_1 - G_{34}}$$

For Type 2 (high-ratio) designs the corresponding equations are $$G_{12} = \frac{1}{1 - \frac{r_1}{r_2}} \frac{r_2}{r_2 - r_1}$$

$$G_{14} = \frac{1}{1 - \frac{r_1}{r_4}} \frac{r_4}{r_4 - r_1}$$

$$S_2 = G_{12} G_{14} = \frac{r_2 r_4}{(r_2 - r_1)(r_4 - r_1)}$$

$$r_4 = \frac{S_2 r_1}{S_2 - G_{12}}$$

$$r_3 = r_4 + \frac{r_2}{G_{12}}$$

$$\frac{r_2}{r_4} = \frac{G_{12}}{G_{34}}$$

$$r_4 = \frac{-8}{2P} G_{34}$$

The present paper is concerned only with the selection of relative gear sizes of the race, roller, roller gear and input drive gear to give definite vibration-to-drive ratios. There are, however, a variety of ways in which these gears may be arranged in a particular oscillator and these fall, in the case of race and roller types, broadly into three styles.

Style a.—The power to drive the roller is put in at the ends of the roller, and the roller may be solid (FIG. 2).

Style b.—The power to drive the roller is put into the roller (which is hollow) at the center, or about its center from a shaft which passes through the roller. (FIGS. 5–8).

Style c.—The power to drive the roller is put into the roller (which may be solid) at its center or about its center but at its periphery, by means of an internal gear which surrounds the roller and is coaxial with the race. (FIG. 9).

Similar variations are possible with the ring-and-pin types except that the rings are, by necessity, always hollow.

With the foregoing in mind, it will become evident that the generators of FIGS. 2 and 5 are not only Type 1 generators, but are of the character represented in the diagram of FIG. 12. The first has a step-up ratio of approximately two, and the second approximately 1.3. The Type 1 generator of FIG. 6 has a ratio of 1 to 1. The Type 2 generator of FIG. 8 has a step-up drive ratio of approximately 7 to 1. The Type 2 generator of FIG. 9 has two spur gears in the initial drive giving a step-down of 2 to 1, while the gear ratio from the input gear to the output is about 1 to 30, so that an over-all step-up drive ratio of 1 to 15 is obtained. Thus a fairly high step-up ratio, with a high initial drive frequency, is achieved. As another typical example, assume a required one-to-one over-all gear ratio, and a Type 2 generator. Using a generator of the type of FIG. 9, it is easy to use, for example, a modified 4 to 1 step-down in the initial spur gear drive, and to use a 4 to 1 step-up from the internal input gear 260 to the frequency of roller rotation in the race (the output frequency). In this general connection, it will be observed that, for Type 2 generators, as the diameter of the input internal gear 260 is made to approach the diameter of the internal race gears 265 and 266, the gear ratio approaches infinity.

I claim:
1. In a vibration generator and load system therefor:
a resonator;
a generator body member sonically coupled to said resonator;
a stationary raceway means on said body member having an external cylindrical raceway surface;
a rotor means in the form of a ring having an internal cylindrical bearing surface of a larger diameter than that of said cylindrical raceway surface on said raceway means, said rotor means arranged for orbital travel with its bearing surface in rolling engagement with said raceway surface, whereby to develop a centrifugal force exerted by said rotor means on said raceway means;
an internal gear connected in axial alignment with said rotor means and coaxially positioned in said ring;
a spur gear fixedly attached to said body member in axial alignment with said raceway means and in coaxial relationship with said external cylindrical raceway surface;
said internal gear being an orbital gear that rolls in an orbital path around and in mesh with said spur gear; and
means for effecting orbital travel of said rotor means about said raceway surface comprising means for spinning said ring on said raceway surface with said internal gear in mesh with said spur gear;
the tooth thicknesses of the gear teeth on said spur and internal gears being no greater than the distances between teeth on their mating gears when the generator is in dynamic operation with centrifugal force development by said rotor means and with resonant vibratory action of said resonator so that circumferential accommodation is accomplished between said teeth, so as to reduce tooth loads while operating with said resonator.

2. The subject matter of claim 1 wherein said means for spinning said ring comprises a pair of meshing spur and internal gears, with one of said internal gears coaxially connected to said ring and the other of said internal gears supported for rotation on an axis coaxial with said cylindrical raceway surface.

References Cited

UNITED STATES PATENTS

| 2,198,148 | 4/1940 | Baily | 259—1 |
| 2,553,541 | 5/1951 | Bodine | 173—49 X |
| 2,881,620 | 4/1959 | Nordegren | 74—87 |

FOREIGN PATENTS

| 219,920 | 2/1962 | Austria. |

MILTON KAUFMAN, *Primary Examiner.*

U.S. Cl. X.R.

173—49; 259—1